US010634974B2

United States Patent
Shukunami et al.

(10) Patent No.: US 10,634,974 B2
(45) Date of Patent: Apr. 28, 2020

(54) WAVELENGTH CONVERTER, WAVELENGTH CONVERSION METHOD, AND TRANSMISSION DEVICE

(71) Applicant: FUJITSU LIMITED, Kawasaki-shi, Kanagawa (JP)

(72) Inventors: Norifumi Shukunami, Yokohama (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/402,767

(22) Filed: May 3, 2019

(65) Prior Publication Data
US 2019/0353980 A1 Nov. 21, 2019

(30) Foreign Application Priority Data

May 16, 2018 (JP) .................................. 2018-094808

(51) Int. Cl.
*G02F 2/00* (2006.01)
*G02F 1/35* (2006.01)
*H01S 3/067* (2006.01)

(52) U.S. Cl.
CPC ............ *G02F 2/004* (2013.01); *G02F 1/3536* (2013.01); *H01S 3/0677* (2013.01);
(Continued)

(58) Field of Classification Search
None
See application file for complete search history.

(56) References Cited

U.S. PATENT DOCUMENTS

| 7,043,099 | B1 | 5/2006 | Watanabe |
| 8,041,169 | B2 * | 10/2011 | Watanabe ............... G02F 1/395 359/328 |

(Continued)

FOREIGN PATENT DOCUMENTS

| JP | 2000-75330 | 3/2000 |
| JP | 2000-258811 | 9/2000 |
| JP | 2005-012358 | 1/2005 |

OTHER PUBLICATIONS

J. P. R. Lacey, M. A. Summerfield and S. J. Madden, "Tunability of polarization-insensitive wavelength converters based on four-wave mixing in semiconductor optical amplifiers," in Journal of Lightwave Technology, vol. 16, No. 12, pp. 2419-2427, Dec. 1998. (Year: 1998).*

*Primary Examiner* — Rhonda S Peace
(74) *Attorney, Agent, or Firm* — Fujitsu Patent Center

(57) ABSTRACT

A converter includes a combiner configured to polarization-combine a first pump light and a second pump light, a nonlinear medium configured to wavelength-convert first signal light into second signal light to output the second signal light after wavelength conversion from a second port, and to wavelength-convert the second signal light into first signal light to output the first signal light after wavelength conversion from the first port, a first circulator configured to input the first signal light from the first port into the nonlinear medium, and output the first signal light after wavelength conversion in the nonlinear medium from the first port, and a second circulator configured to input the second signal light from the second port into the nonlinear medium, and output the second signal light after wavelength conversion in the nonlinear medium from the second port.

12 Claims, 10 Drawing Sheets

(52) U.S. Cl.
CPC ...... *H01S 3/06712* (2013.01); *H01S 3/06766* (2013.01); *H01S 3/06775* (2013.01); *G02F 2002/006* (2013.01)

(56) References Cited

U.S. PATENT DOCUMENTS

| | | | | |
|---|---|---|---|---|
| 8,107,154 | B2* | 1/2012 | Arahira | G02F 2/004 359/279 |
| 8,351,110 | B2* | 1/2013 | Watanabe | G02F 1/39 359/330 |
| 2019/0109666 | A1* | 4/2019 | Kato | H04J 14/0256 |
| 2019/0353980 | A1* | 11/2019 | Shukunami | H01S 3/0677 |

* cited by examiner

WAVELENGTH CONVERTER, WAVELENGTH CONVERSION METHOD, AND TRANSMISSION DEVICE

CROSS-REFERENCE TO RELATED APPLICATION

This application is based upon and claims the benefit of priority of the prior Japanese Patent Application No. 2018-94808, filed on May 16, 2018, the entire contents of which are incorporated herein by reference.

FIELD

The embodiments discussed herein are related to a wavelength converter, a wavelength conversion method, and a transmission device.

BACKGROUND

In recent years, with an increase in communication demands, for example, it has been demanded to increase the number of optical fiber cores, optical signal capacity per wavelength, and the number of wavelength division multiplexing (WDM) channels, thereby enhancing the transmission capacity. However, because of high laying costs of optical fibers, it has been required to increase mainly the optical signal capacity and the number of WDM channels without increasing the number of optical fiber cores, to enhance the transmission capacity. The transmission device achieves communication using light wavelengths in a conventional band (C band) having a range of 1530 nm to 1565 nm, for example. However, using only the C band, there is a limit to enhance the transmission capacity.

Examples of the optical communication band include the band in the range of 1260 nm to 1675 nm, including the C band, the O band, the E band, the S band, the L band, and the U band. The O band (Original Band) is the band in the range of 1260 nm to 1360 nm, the E band (Extended Band) is the band in the range of 1360 nm to 1460 nm, and the S band (Short Band) is the band in the range of 1460 nm to 1530 nm. The L band (Long Band) is the band in the range of 1565 nm to 1625 nm, and the U band (Ultra-Long Band) is the band in the range of 1625 nm to 1675 nm.

Thus, attempts have been made to use the communication bands such as the L band and the S band in addition to the C band, thereby further enhancing the transmission capacity in the transmission device. The multi-band WDM system using a plurality of wavelength bands requires a wavelength converter or the like for wavelength-converting, for example, multiplexed light in the C band into multiplexed light in the L band. The wavelength converter makes use of nonlinear optical phenomenon of the four-wave mixing (FWM), for example. FIG. 9 is a view illustrating an example of a conventional wavelength converter 100. The wavelength converter 100 illustrated in FIG. 9 has an input port 101, a pump light source 102, a WDM coupler 103, an optical circulator 104, and a polarizing beam splitter (PBS) 105. The wavelength converter 100 has a polarization-maintaining nonlinear fiber 106, an optical BPF 107, and an output port 108. For example, in the case of the wavelength converter 100 that converts multiplexed light in the C band into multiplexed light in the L band, the multiplexed light in the C band before wavelength conversion is signal light, and the multiplexed light in the L band after wavelength conversion is converted light.

The input port 101 is a port that inputs the signal light. The pump light source 102 is a light source that outputs pump light. The WDM coupler 103 multiplexes the signal light from the input port 101 and the pump light from the pump light source 102. The optical circulator 104 outputs the signal light and the pump light from the WDM coupler 103 to the PBS 105, and outputs the converted light after wavelength conversion, the signal light, and the pump light from the PBS 105 to the optical BPF 107. The PBS 105 divides the signal light and the pump light before wavelength conversion into vertically-polarized signal light and pump light and horizontally-polarized signal light and pump light. The PBS 105 inputs the vertically-polarized signal light and pump light in an X direction of the polarization-maintaining nonlinear fiber 106, and inputs the horizontally-polarized signal light and pump light in a Y direction of the polarization-maintaining nonlinear fiber 106.

Using four-wave mixing of the horizontally-polarized pump light and the horizontally-polarized signal light, the polarization-maintaining nonlinear fiber 106 wavelength-converts the horizontally-polarized signal light into the horizontally-polarized converted light while maintaining the horizontally-polarized signal light. Then, the polarization-maintaining nonlinear fiber 106 outputs the horizontally-polarized converted light, signal light, and pump light to the PBS 105. Using four-wave mixing of the vertically-polarized pump light and the vertically-polarized signal light, the polarization-maintaining nonlinear fiber 106 wavelength-converts the vertically-polarized signal light into the vertically-polarized converted light while maintaining the vertically-polarized signal light. Then, the polarization-maintaining nonlinear fiber 106 outputs the vertically-polarized converted light, signal light, and pump light to the PBS 105.

The PBS 105 multiplexes the vertically-polarized converted light, pump light, and signal light and the horizontally-polarized converted light, pump light, and signal light, and outputs the converted light after wavelength conversion, signal light, and pump light to the optical circulator 104. The optical circulator 104 outputs the converted light after wavelength conversion, signal light, and pump light to the optical BPF 107. The optical BPF 107 extracts only the converted light from the converted light after wavelength conversion, signal light, and pump light, and outputs the extracted converted light to the output port 108. That is, the wavelength converter 100 may wavelength-convert the signal light in the C band into the signal light (converted light) in the L band.

However, to improve the wavelength conversion efficiency of the four-wave mixing, the wavelength converter 100 has to match the polarization state of the signal light with the polarization state of the pump light. The normal optical fiber has two polarization modes of a horizontal polarization mode and a vertical polarization mode, which are orthogonal to each other. In the normal optical fiber, the core becomes noncircular due to a stress exerted on the optical fiber and thus, the polarization of light during propagation varies, such that the polarization state of the signal light does not become fixed in an input stage of the wavelength converter 100. Further, to match the polarization state of the signal light with the polarization state of the pump light, the pump light inputted to the wavelength converter 100 also has to have two orthogonal polarization states.

FIG. 10 is a view illustrating an example of the polarization state of the pump light in a polarization-maintaining nonlinear fiber 120. In the polarization-maintaining nonlinear fiber 120 illustrated in FIG. 10, a circular stress application part 122 is disposed on each side of a core 121. For example, the stress application part 122 has different refractive indexes in the horizontal polarization mode and the vertical polarization mode and thus, has different propagation rates. As a result, when a polarized wave of the pump light is inputted at 45 degrees, the polarization state varies in the signal propagation direction of the fiber to generate the vertically-polarized pump light and the horizontally-polarized pump light, which are orthogonal to each other.

For example, related arts are disclosed in Japanese Laid-open Patent Publication Nos. 2000-75330, 2005-12358, and 2000-258811.

In the wavelength converter 100, to ensure the two orthogonal polarization states of single pump light, the pump light has to be inputted to the PBS 105 in the polarization state of 45 degrees. Thus, in the wavelength converter 100, to maintain the pump light in the polarization state of 45 degrees, it is required for connecting from the pump light source 102 to the polarization-maintaining nonlinear fiber 106 via a polarization-maintaining fiber. Further, in the section from the pump light source 102 to the polarization-maintaining nonlinear fiber 106, the WDM coupler 103, the optical circulator 104, and the PBS 105 each use a polarization-maintaining fiber-type optical component. As a result, the polarization state of the pump light in the input stage of the PBS 105 may be maintained to 45 degrees, thereby inputting and vertically-polarized pump light and horizontally-polarized pump light to the polarization-maintaining nonlinear fiber 106. That is, to maintain the polarization state of the pump light of 45 degrees in the section from the pump light source 102 to the PBS 105, polarization-maintaining fiber-type optical components are used in the section, increasing cost of components of the wavelength converter 100.

Moreover, since an output of a semiconductor laser diode (LD) used as a current pump light source is about 18 dBm, pump light having about 20 dBm has to be inputted to the polarization-maintaining nonlinear fiber used for wavelength conversion of the wavelength converter. Accordingly, an optical amplifier for amplifying pump light is required in an output stage of the pump light source. However, optical components such as an optical isolator, an erbium doped fiber (EDF), and an optical coupler in the optical amplifier also are polarization-maintaining fiber-type optical components. Such polarization-maintaining fiber-type optical components have high scarcity value and high component cost. In other words, the component cost of the wavelength converter 100 is high.

In consideration of the above-mentioned situation, it is desirable to provide a wavelength converter capable of inputting pump light in orthogonal polarization states to a nonlinear medium while decreasing the number of polarization-maintaining fiber-type optical components.

SUMMARY

According to an aspect of the embodiments, a wavelength converter includes a first light source configured to generate first pump light, a second light source configured to generate second pump light having the same wavelength as the first pump light, a polarization combiner configured to polarization-combine the first pump light and the second pump light such that the first pump light is orthogonal to the second pump light, a nonlinear medium configured to wavelength-convert first signal light inputted from a first port into second signal light having a wavelength band that is different from a wavelength band of the first signal light by using the polarization-combined first pump light and second pump light to output the second signal light after wavelength conversion from a second port, and to wavelength-convert the second signal light inputted from the second port into first signal light by using the polarization-combined first pump light and second pump light to output the first signal light after wavelength conversion from the first port, a first circulator configured to input the first signal light from the first port into the nonlinear medium, and output the first signal light after wavelength conversion in the nonlinear medium from the first port, and a second circulator configured to input the second signal light from the second port into the nonlinear medium, and output the second signal light after wavelength conversion in the nonlinear medium from the second port.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a wavelength converter, a wavelength conversion method, and a transmission device of this application will be described below in detail. The embodiments do not limit disclosed technique. The following embodiments may be appropriately combined with each other so as not to cause contradiction.

Embodiment 1

Figure 1:
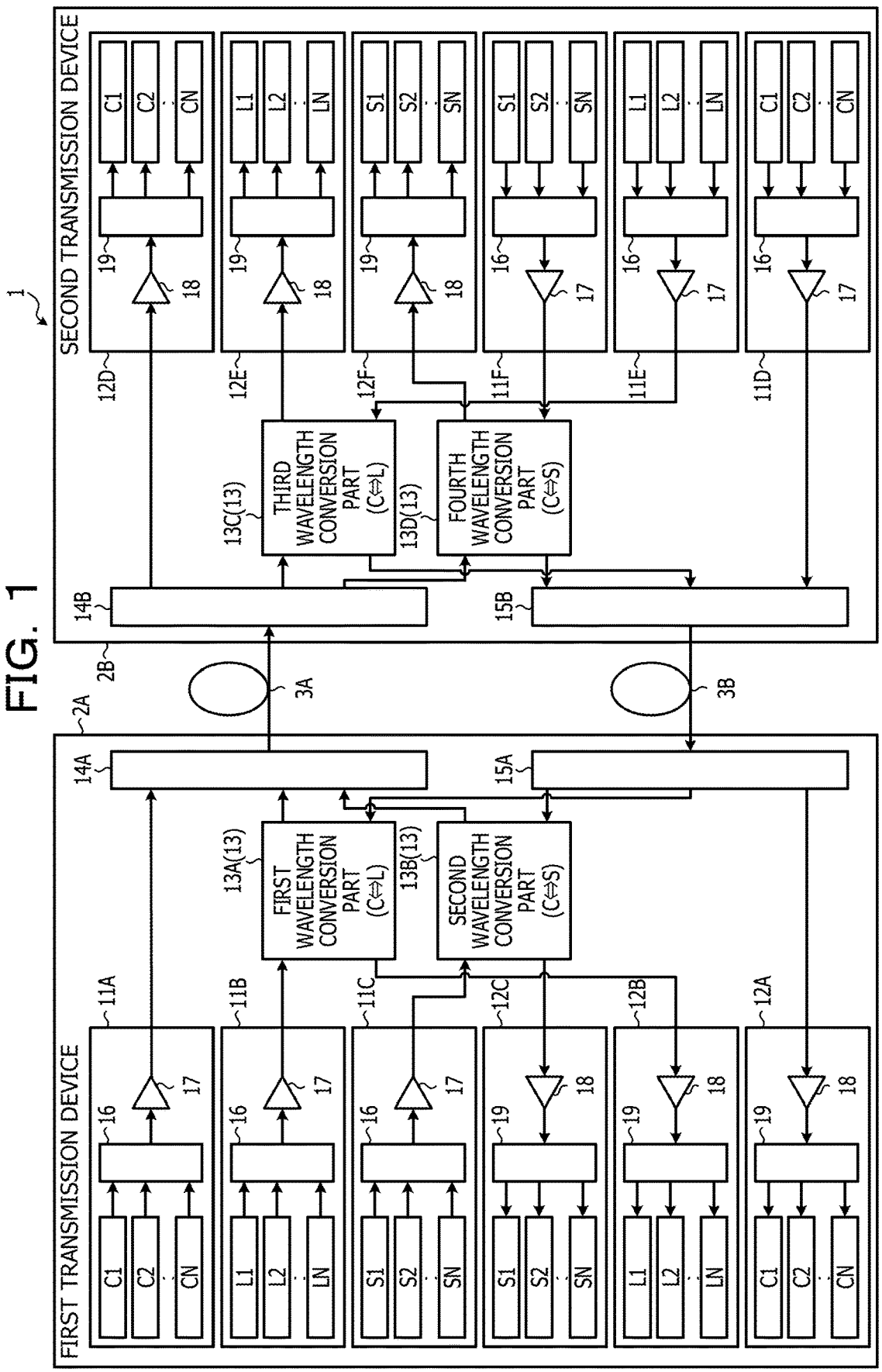
FIG. 1 is a view illustrating an example of a WDM system in the present embodiment.

FIG. 1 is a view illustrating an example of a WDM system 1 in the present embodiment. The WDM system 1 illustrated in FIG. 1 has a first transmission device 2A, a second transmission device 2B, and an up transmission line 3A and a down transmission line 3B that transmit wavelength multiplexed light between the transmit first transmission device 2A and the second transmission device 2B. The WDM system 1 is a multi-band system that transmits multiplexed light in different wavelength bands such as the C band, the L band, and the S band. The first transmission device 2A has the first and third optical transmission groups 11A to 11C, the first and third optical reception group 12A to 12C, a plurality of wavelength conversion parts 13, a first wavelength multiplexing part 14A, and a first wavelength demultiplexing part 15A.

The first optical transmission group 11A has a plurality of optical transmission parts C1 to CN in the C band, a multiplexing part 16, and a transmitted light multiplexing part 17. The optical transmission parts C1 to CN output optical signals each having a wavelength in the C band to the multiplexing part 16. The multiplexing part 16 multiplexes the optical signals in the C band from the optical transmission parts C1 to CN, and outputs first multiplexed light in the C band to the transmitted light multiplexing part 17. The transmitted light multiplexing part 17 amplifies the first multiplexed light in the C band, and outputs the amplified first multiplexed light in the C band to the first wavelength multiplexing part 14A. The second optical transmission group 11B has a plurality of optical transmission parts L1 to LN in the C band, a multiplexing part 16, and a transmitted light multiplexing part 17. The optical transmission parts L1 to LN each output an optical signal having a wavelength in the C band to the multiplexing part 16. The multiplexing part 16 multiplexes the optical signals in the C band from the optical transmission parts L1 to LN, and outputs first multiplexed light in the C band to the transmitted light multiplexing part 17. The transmitted light multiplexing part 17 amplifies the first multiplexed light in the C band, and outputs the amplified first multiplexed light in the C band to the first wavelength conversion parts 13A. The third optical transmission group 11C has a plurality of optical transmission parts S1 to SN in the C band, a multiplexing part 16, and a transmitted light multiplexing part 17. The optical transmission parts S1 to SN each output an optical signal having a wavelength in the C band to the multiplexing part 16. The multiplexing part 16 multiplexes the optical signals in the C band from the optical transmission parts S1 to SN, and outputs first multiplexed light in the C band to the transmitted light multiplexing part 17. The transmitted light multiplexing part 17 amplifies the first multiplexed light in the C band, and outputs the amplified first multiplexed light in the C band to the second wavelength conversion part 13B.

The wavelength conversion parts 13 include, for example, the first wavelength conversion part 13A and the second wavelength conversion part 13B. The first wavelength conversion part 13A wavelength-converts the first multiplexed light in the C band from the second optical transmission group 11B into second multiplexed light in the L band, and outputs the second multiplexed light in the L band after wavelength conversion to the first wavelength multiplexing part 14A. The second wavelength conversion parts 13B wavelength-converts the first multiplexed light in the C band from the third optical transmission group 11C into third multiplexed light in the S band, and outputs the third multiplexed light in the S band after wavelength conversion to the first wavelength multiplexing part 14A.

The first wavelength multiplexing part 14A multiplexes the first multiplexed light in the C band from the first optical transmission group 11A, the second multiplexed light in the L band from the first wavelength conversion part 13A, and the third multiplexed light in the S band from the second wavelength conversion parts 13B. Then, the first wavelength multiplexing part 14A outputs the first multiplexed light, the second multiplexed light, and the third multiplexed light to the up transmission line 3A.

The first optical reception group 12A has a received light amplification part 18, a demultiplexing part 19, and a plurality of optical reception parts C1 to CN in the C band. The second optical reception group 12B has a received light amplification part 18, a demultiplexing part 19, and a plurality of optical reception parts L1 to LN in the C band. The third optical reception group 12C has a received light amplification part 18, a demultiplexing part 19, and a plurality of optical reception parts S1 to SN in the C band.

The first wavelength demultiplexing part 15A demultiplexes the first multiplexed light, the second multiplexed light, and the third multiplexed light from the wavelength multiplexed light from the down transmission line 3B. The first wavelength demultiplexing part 15A outputs the first multiplexed light to the first optical reception group 12A, the second multiplexed light to the first wavelength conversion parts 13A, and the third multiplexed light to the second wavelength conversion parts 13B.

The received light amplification part 18 in the first optical reception group 12A optically amplifies the first multiplexed light from the first wavelength demultiplexing part 15A, and outputs the optically-amplified first multiplexed light to the demultiplexing part 19. The demultiplexing part 19 demultiplexes the first multiplexed light into optical signals, and outputs the optical signals to the respective optical reception parts C1 to CN.

The first wavelength conversion part 13A wavelength-converts the second multiplexed light in the L band from the first wavelength demultiplexing part 15A into the first multiplexed light in the C band, and outputs the first multiplexed light in the C band after wavelength conversion to the second optical reception group 12B. The received light amplification part 18 in the second optical reception group 12B optically amplifies the first multiplexed light in the C band from the first wavelength conversion parts 13A, and outputs the optically-amplified first multiplexed light to the demultiplexing part 19. The demultiplexing part 19 demultiplexes the first multiplexed light into optical signals, and outputs the optical signals to the respective optical reception parts L1 to LN.

The second wavelength conversion parts 13B wavelength-converts the third multiplexed light in the S band from the first wavelength demultiplexing part 15A into the first multiplexed light in the C band, and outputs the first multiplexed light in the C band after wavelength conversion to the third optical reception group 12C. The received light amplification part 18 in the third optical reception group 12C optically amplifies the first multiplexed light in the C band from the second wavelength conversion parts 13B, and outputs the optically-amplified first multiplexed light to the demultiplexing part 19. The demultiplexing part 19 demultiplexes the first multiplexed light into optical signals, and outputs the optical signals to the respective optical reception parts S1 to SN.

The second transmission device 2B has fourth to sixth optical transmission groups 11D to 11F, fourth to sixth optical reception groups 12D to 12F, a plurality of wavelength conversion parts 13, a second wavelength multiplexing part 14B, and a second wavelength demultiplexing part 15B.

The fourth optical transmission group 11D has a plurality of optical transmission parts C1 to CN in the C band, a multiplexing part 16, and a transmitted light multiplexing part 17. The optical transmission parts C1 to CN each outputs an optical signal having a wavelength in the C band to the multiplexing part 16. The multiplexing part 16 multiplexes the optical signals in the C band from the optical transmission parts C1 to CN, and outputs first multiplexed light in the C band to the transmitted light multiplexing part 17. The transmitted light multiplexing part 17 amplifies the first multiplexed light in the C band, and outputs the amplified first multiplexed light in the C band to the second wavelength multiplexing part 14B. The fifth optical transmission group 11E has a plurality of optical transmission parts L1 to LN in the C band, a multiplexing part 16, and a transmitted light multiplexing part 17. The optical transmission parts L1 to LN each output an optical signal having a wavelength in the C band to the multiplexing part 16. The multiplexing part 16 multiplexes the optical signals in the C band from the optical transmission parts L1 to LN, and outputs first multiplexed light in the C band to the transmitted light multiplexing part 17. The transmitted light multiplexing part 17 amplifies the first multiplexed light in the C band, and outputs the amplified first multiplexed light in the C band to the third wavelength conversion parts 13C. The sixth optical transmission group 11F has a plurality of optical transmission parts S1 to SN in the C band, a multiplexing part 16, and a transmitted light multiplexing part 17. The optical transmission parts S1 to SN each output an optical signal having a wavelength in the C band to the multiplexing part 16. The multiplexing part 16 multiplexes the optical signals in the C band from the optical transmission parts S1 to SN, and outputs first multiplexed light in the C band to the transmitted light multiplexing part 17. The transmitted light multiplexing part 17 amplifies the first multiplexed light in the C band, and outputs the amplified first multiplexed light in the C band to the fourth wavelength conversion parts 13D.

The wavelength conversion parts 13 include, for example, the third wavelength conversion part 13C and the fourth wavelength conversion part 13D. The third wavelength conversion part 13C wavelength-converts the first multiplexed light in the C band from the fifth optical transmission group 11E into the second multiplexed light in the L band, and outputs the second multiplexed light in the L band after wavelength conversion to the second wavelength multiplexing part 14B. The fourth wavelength conversion part 13D wavelength-converts the first multiplexed light in the C band from the sixth optical transmission group 11F into the third multiplexed light in the S band, and outputs the third multiplexed light in the S band after wavelength conversion to the second wavelength multiplexing part 14B.

The second wavelength multiplexing part 14B multiplexes the first multiplexed light in the C band from the fourth optical transmission group 11D, the second multiplexed light in the L band from the third wavelength conversion part 13C, and the third multiplexed light in the S band from the fourth wavelength conversion parts 13D. Then, the second wavelength multiplexing part 14B outputs the first multiplexed light, the second multiplexed light, and the third multiplexed light to the down transmission line 3B.

The fourth optical reception group 12D has a received light amplification part 18, a demultiplexing part 19, and a plurality of optical reception parts C1 to CN in the C band. The fifth optical reception group 12E has a received light amplification part 18, a demultiplexing part 19, and a plurality of optical reception parts L1 to LN in the C band. The sixth optical reception group 12F has a received light amplification part 18, a demultiplexing part 19, and a plurality of optical reception parts S1 to SN in the C band.

The second wavelength demultiplexing part 15B demultiplexes the first multiplexed light, the second multiplexed light, and the third multiplexed light from the wavelength multiplexed light from the up transmission line 3A. The second wavelength demultiplexing part 15B outputs the first multiplexed light to the fourth optical reception group 12D, the second multiplexed light to the third wavelength conversion parts 13C, and the third multiplexed light to the fourth wavelength conversion parts 13D.

The received light amplification part 18 in the fourth optical reception group 12D optically amplifies the first multiplexed light from the second wavelength demultiplexing part 15B, and outputs the optically-amplified first multiplexed light to the demultiplexing part 19. The demultiplexing part 19 demultiplexes the first multiplexed light into optical signals, and outputs the optical signals to the respective optical reception parts C1 to CN.

The third wavelength conversion part 13C wavelength-converts the second multiplexed light in the L band from the second wavelength demultiplexing part 15B into the first multiplexed light in the C band, and outputs the first multiplexed light in the C band after wavelength conversion to the fifth optical reception group 12E. The received light amplification part 18 in the fifth optical reception group 12E optically amplifies the first multiplexed light in the C band from the third wavelength conversion parts 13C, and outputs the optically-amplified first multiplexed light to the demultiplexing part 19. The demultiplexing part 19 demultiplexes the first multiplexed light into optical signals, and outputs the optical signals to the respective optical reception parts L1 to LN.

The fourth wavelength conversion parts 13D wavelength-converts the third multiplexed light in the S band from the second wavelength demultiplexing part 15B into the first multiplexed light in the C band, and outputs the first multiplexed light in the C band after wavelength conversion to the sixth optical reception group 12F. The received light amplification part 18 in the sixth optical reception group 12F optically amplifies the first multiplexed light in the C band from the fourth wavelength conversion parts 13D, and outputs the optically-amplified first multiplexed light to the demultiplexing part 19. The demultiplexing part 19 demultiplexes the first multiplexed light into optical signals, and outputs the optical signals to the respective optical reception parts S1 to SN.

Figure 2:
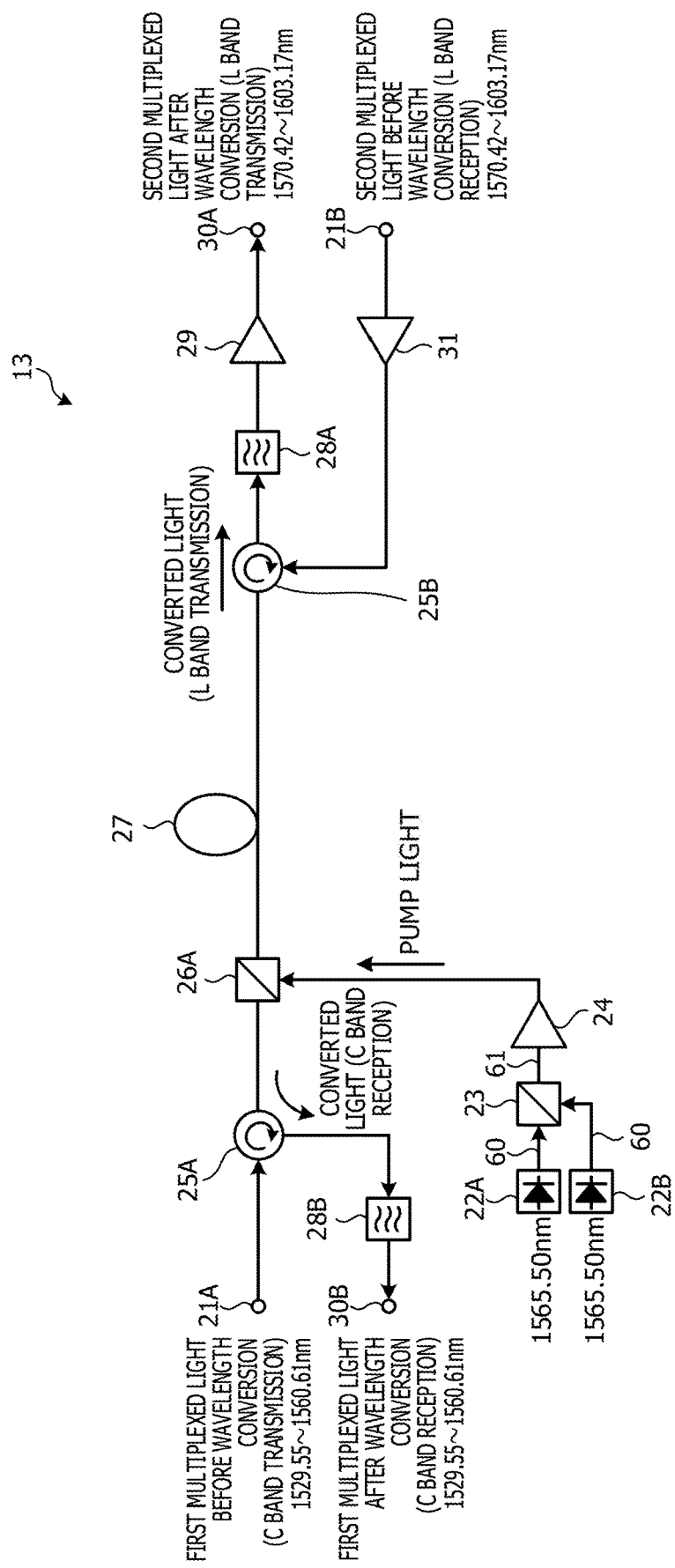
FIG. 2 is a view illustrating an example of a wavelength conversion part in an Embodiment 1.

Next, the wavelength conversion parts 13 will be described below in detail. FIG. 2 is a view illustrating an example of the wavelength conversion part 13 in the Embodiment 1. The wavelength conversion part 13 illustrated in FIG. 2 has a first input part 21A, a first light source 22A, a second light source 22B, a polarizing beam splitter (PBS) 23 that is a polarization combination part, and a first optical amplification part 24. The wavelength conversion parts 13 further has a first optical circulator 25A, a first WDM coupler 26A, a nonlinear fiber 27, a second optical circulator 25B, a first optical BPF 28A, a second optical amplification part 29, and a first output part 30A. The wavelength conversion parts 13 further has a second input part 21B, a third optical amplification part 31, a second optical BPF 28B, and a second output part 30B. The PBS 23 connects the first light source 22A to the second light source 22B via a polarization-maintaining fiber 60 maintaining the polarization state. The PBS 23 is connected to the nonlinear fiber 27 via a normal fiber 61. The first input part 21A is connected to the nonlinear fiber 27, the nonlinear fiber 27 to the first output part 30A, the second input part 21B to the nonlinear fiber 27, and the nonlinear fiber 27 to the second output part 30B via the normal fiber 61. The first input part 21A and the second output part 30B serve as a first port for the nonlinear fiber 27, while the second input part 21B and the first output part 30A serve as a second port for the nonlinear fiber 27.

Given that the wavelength conversion parts 13 is the first wavelength conversion parts 13A, for example, the first input part 21A is connected to the second optical transmission group 11B, receives first multiplexed light (signal light) in the C band, and outputs first multiplexed light to the first optical circulator 25A. For example, the first multiplexed light is assumed to be in the C band in the range of 1529.55 nm to 1560.61 nm. The first optical circulator 25A outputs the first multiplexed light to the first WDM coupler 26A. The first light source 22A is a semiconductor LD for generating first pump light. The first light source 22A outputs the first pump light to the PBS 23. In the case where the first multiplexed light in the C band is wavelength-converted into the second multiplexed light in the L band, the first pump light is assumed to have a wavelength of 1565.50 nm, for example. The second light source 22B is a semiconductor LD for generating second pump light. The second light source 22B outputs the second pump light to the PBS 23. The second pump light is also assumed to have a wavelength of 1565.50 nm, for example. The first pump light and the second pump light ideally have the same wavelength, and to remove a wavelength tolerance after wavelength conversion, a difference between the first pump light and the second pump light in wavelength is set within ±0.01 nm. The PBS 23 polarization-combines the first pump light and the second pump light such that the first pump light is orthogonal to the second pump light, to generate horizontally-polarized first pump light and vertically-polarized second pump light. The PBS 23 outputs the horizontally-polarized first pump light and the vertically-polarized second pump light to the first optical amplification part 24.

Figure 3:
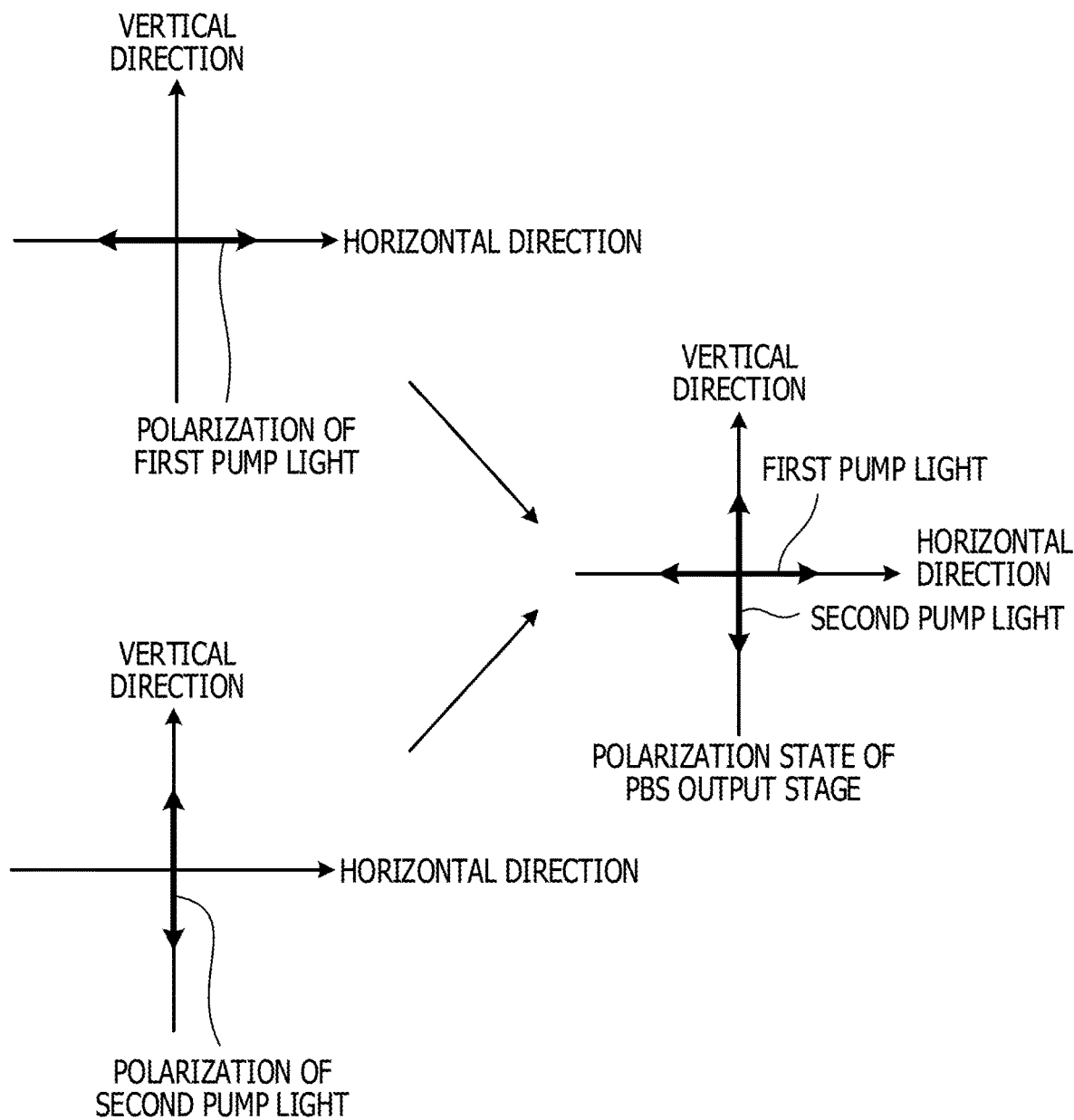
FIG. 3 is a view illustrating an example of a polarization state of first pump light and second pump light.

FIG. 3 is a view illustrating an example of the polarization state of the first pump light and the second pump light. The PBS 23 sets the first pump light to the horizontally polarized state, and the second pump light to the vertically polarized state. The PBS 23 outputs the horizontally-polarized first pump light and the vertically-polarized second pump light to the normal fiber 61. Thus, the PBS 23 is connected to the nonlinear fiber 27 via the normal fiber 61 rather than the polarization-maintaining fiber 60. That is, even when the normal fiber 61 is used, horizontally-polarized first pump light and the vertically-polarized second pump light, which are being transmitted, vary in the similar manner due to stress or noncircular core, maintaining the orthogonal state of the two polarized waves. Accordingly, since the PBS 23 may be connected to the nonlinear fiber 27 via the normal fiber 61, the first optical amplification part 24 and the first WDM coupler 26A may be normal fiber-type optical components.

Further, the first optical amplification part 24 optically amplifies the horizontally-polarized first pump light and the vertically-polarized second pump light, and outputs the optically-amplified first pump light and second pump light to the first WDM coupler 26A. The first light source 22A and the second light source 22B each are configured of, for example, a semiconductor LD, and an output of the current semiconductor LD is about 18 dBm. However, the nonlinear fiber 27 used for wavelength conversion requires pump light of about 20 dBm. Therefore, the first optical amplification part 24 optically amplifies the first pump light and the second pump light to an output enabling wavelength conversion. The first optical amplification part 24 is, for example, an erbium doped optical fiber amplifier (EDFA). As long as the first pump light and the second pump light may ensure the output enabling wavelength conversion from the first light source 22A and the second light source 22B, the first optical amplification part 24 may be omitted and appropriately changed.

The first WDM coupler 26A combines the first multiplexed light in the C band from the first optical circulator 25A, and the first pump light and the second pump light from the first optical amplification part 24, and outputs the combined light to the nonlinear fiber 27. As an example, the nonlinear fiber 27 is a nonlinear medium such as semiconductor and lithium niobate (LiNbO3). The nonlinear fiber 27 wavelength-converts the first multiplexed light in the C band into the second multiplexed light (converted light) in the L band while maintaining the first multiplexed light in the C band by four-wave mixing of the horizontally-polarized first pump light, the vertically-polarized second pump light, and the first multiplexed light in the C band. The nonlinear fiber 27 outputs the first multiplexed light in the C band before wavelength conversion, the second multiplexed light (converted light) in the L band after wavelength conversion, the first pump light, and the second pump light to the second optical circulator 25B.

Figure 4:
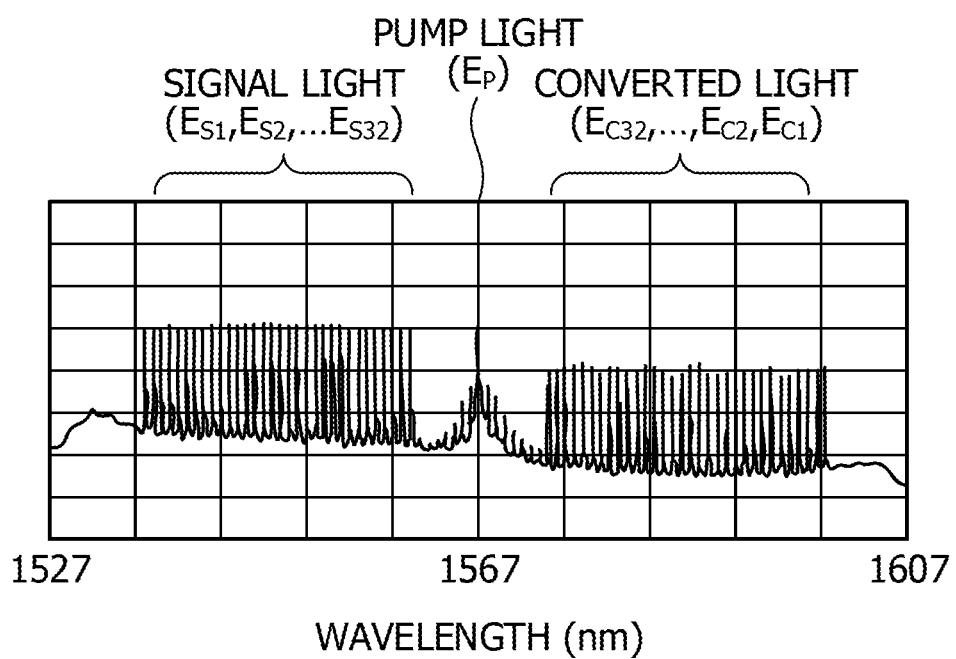
FIG. 4 is a view illustrating an example of signal light, pump light, and converted light.

FIG. 4 is a view illustrating an example of the signal light, the pump light, and the converted light. The wavelength conversion part 13 outputs converted light Ec1 to EcN at positions that symmetrical to signal light Es1 to EsN in wavelength with respect to pump light Ep by four-wave mixing of the signal light, the horizontally-polarized pump light, and the vertically-polarized pump light.

The second optical circulator 25B outputs the first multiplexed light in the C band after wavelength conversion, the second multiplexed light (converted light) in the L band, first pump light, and the second pump light to the first optical BPF 28A. The first optical BPF 28A extracts the second multiplexed light (converted light) in the L band from light outputted from the second optical circulator 25B, and outputs the extracted second multiplexed light in the L band to the second optical amplification part 29. The second optical amplification part 29 optically amplifies the second multiplexed light in the L band to desired output level, and outputs the optically-amplified second multiplexed light in the L band to the first output part 30A. When the second multiplexed light in the L band extracted from the first optical BPF 28A is equal to or greater than the desired output level, optical amplification is unnecessary, and thus, the second optical amplification part 29 may not be used. The first output part 30A is connected to the first wavelength multiplexing part 14A, and outputs the optically-amplified second multiplexed light in the L band to the first wavelength multiplexing part 14A.

The second input part 21B is connected to the first wavelength demultiplexing part 15A, inputs second multiplexed light (signal light) in the L band from the first wavelength demultiplexing part 15A, and outputs the second multiplexed light to the third optical amplification part 31. The third optical amplification part 31 optically amplifies the second multiplexed light in the L band, and outputs the optically-amplified second multiplexed light in the L band to the second optical circulator 25B in the L band. The second optical circulator 25B outputs the second multiplexed light in the L band to the nonlinear fiber 27.

The nonlinear fiber 27 wavelength-converts the second multiplexed light in the L band into the first multiplexed light (converted light) in the C band by four-wave mixing of the horizontally-polarized first pump light and the vertically-polarized second pump light from the first WDM coupler 26A and the second multiplexed light in the L band. The nonlinear fiber 27 outputs the first multiplexed light (converted light) in the C band after wavelength conversion, the second multiplexed light (signal light) in the L band before wavelength conversion, the first pump light, and the second pump light to the first optical circulator 25A. The first optical circulator 25A outputs the first multiplexed light in the C band after wavelength conversion, the second multiplexed light in the L band before wavelength conversion, the first pump light, and the second pump light to the second optical BPF 28B. The second optical BPF 28B extracts the first multiplexed light (converted light) in the C band from light outputted from the first optical circulator 25A, and outputs the extracted first multiplexed light in the C band to the second output part 30B. The second output part 30B is connected to the second optical reception group 12B to output the first multiplexed light in the C band to the second optical reception group 12B.

The first wavelength conversion parts 13A wavelength-converts the first multiplexed light in the C band from the first input part 21A into the second multiplexed light in the L band, and outputs the second multiplexed light in the L band to the first output part 30A. The first wavelength conversion parts 13A wavelength-converts the second multiplexed light in the L band from the second input part 21B into first multiplexed light in the C band, and outputs the first multiplexed light in the C band to the second output part 30B. The second optical amplification part 29 and the third optical amplification part 31 each may be, for example, EDFA.

The PBS 23 polarization-combines the first pump light from the first light source 22A and the second pump light from the second light source 22B. The PBS 23 outputs the polarization-combined vertically-polarized first pump light and horizontally-polarized second pump light to the nonlinear fiber 27 via the first optical amplification part 24 and a first WDM coupler 26. In this case, the polarization-maintaining fiber 60 is required between the first light source 22A and the PBS 23, and between the second light source 22B and the PBS 23. However, the PBS 23 is connected to the nonlinear fiber 27 via the normal fiber 61 rather than the polarization-maintaining fiber 60. Further, the first optical amplification part 24 and the first WDM coupler 26A between the PBS 23 and the nonlinear fiber 27 each may be a normal fiber-type optical component.

For convenience of explanation, the wavelength conversion part 13 illustrated in FIG. 2 is described using the first wavelength conversion part 13A. Since the first wavelength conversion part 13A has the same configuration as the second to fourth wavelength conversion parts 13B to 13D, description of overlapping configurations and operations is omitted.

In the second wavelength conversion part 13B, the first input part 21A is connected to the third optical transmission group 11C, the first output part 30A is connected to the first wavelength multiplexing part 14A, the second input part 21B is connected to first wavelength demultiplexing part 15A, and the second output part 30B is connected to the third optical reception group 12C. For example, in the case where the third multiplexed light in the S band in the range of 1481.9 nm to 1511.1 nm is wavelength-converted into the first multiplexed light in the C band, the light wavelength of the first pump light and the second pump light is assumed to be 1520.2 nm. The second wavelength conversion parts 13B wavelength-converts the first multiplexed light in the C band from the first input part 21A into third multiplexed light in the S band, and outputs the third multiplexed light in the S band to the first output part 30A. The second wavelength conversion parts 13B wavelength-converts the third multiplexed light in the S band from the second input part 21B into first multiplexed light in the C band, and outputs the first multiplexed light in the C band to the second output part 30B. In the case of the S band, the second optical amplification part 29 and the third optical amplification part 31 each may be, for example, a thulium-doped fiber amplifier.

In the third wavelength conversion part 13C, the first input part 21A is connected to the fifth optical transmission group 11E, the first output part 30A is connected to the second wavelength multiplexing part 14B, the second input part 21B is connected to the second wavelength demultiplexing part 15B, and the second output part 30B is connected to the fifth optical reception group 12E. The third wavelength conversion part 13C wavelength-converts the first multiplexed light in the C band from the first input part 21A into second multiplexed light in the L band, and outputs the second multiplexed light in the L band to the first output part 30A. The third wavelength conversion parts 13C wavelength-converts the second multiplexed light in the L band from the second input part 21B into the first multiplexed light in the C band, and outputs the first multiplexed light in the C band to the second output part 30B.

In the fourth wavelength conversion part 13D, the first input part 21A is connected to the sixth optical transmission group 11F, the first output part 30A is connected to the second wavelength multiplexing part 14B, the second input part 21B is connected to the second wavelength demultiplexing part 15B, and the second output part 30B is connected to sixth optical reception group 12F. The fourth wavelength conversion parts 13D wavelength-converts first multiplexed light in the C band from the first input part 21A into third multiplexed light in the S band, and outputs the third multiplexed light in the S band to the first output part 30A. The second wavelength conversion parts 13B wavelength-converts the third multiplexed light in the S band from the second input part 21B into first multiplexed light in the C band, and outputs the first multiplexed light in the C band to the second output part 30B. In the case of the S band, the second optical amplification part 29 and the third optical amplification part 31 each may be, for example, a thulium-doped fiber amplifier.

In the WDM system 1, optical components including the optical transmission part, the optical reception part, and the optical amplification parts may be commonly used as optical components in the C band, thereby reducing the component cost, and the S band and the L band may be used during transmission to enhance the transmission capacity.

In the PBS 23 in the wavelength conversion part 13 in the Embodiment 1, the first light source 22A is connected to the second light source 22B via the polarization-maintaining fiber 60. Then, the PBS 23 polarization-combines the first pump light from the first light source 22A and the second pump light from the second light source 22B. Then, the PBS 23 outputs the polarization-combines vertically-polarized first pump light and horizontally-polarized second pump light to the nonlinear fiber 27 via the first optical amplification part 24 and the first WDM coupler 26. That is, the first pump light and the second pump light are polarization-combined such that the first pump light is orthogonal to the second pump light, and the polarization-combined pump light is inputted to the nonlinear fiber 27. As a result, since the polarization-combined pump light is transmitted from the PBS 23 to the nonlinear fiber 27, it is unnecessary for using a conventional polarization-maintaining fiber-type optical component that maintains the polarization state of pump light to 45 degrees. Therefore, the vertically-polarized pump light and the horizontally-polarized pump light in the orthogonal polarization states may be inputted to the nonlinear fiber 27 while decreasing the number of polarization-maintaining fiber-type optical components.

In the first wavelength conversion parts 13A, when the first multiplexed light (signal light) in the C band is wavelength-converted into the second multiplexed light (converted light) in the L band, the first pump light and the second pump light are inputted in the same direction as the propagation direction of the signal light. However, when the second multiplexed light (signal light) in the L band is wavelength-converted into the first multiplexed light (converted light) in the C band, the first pump light and the second pump light are inputted in the opposite direction to the propagation direction of the signal light, lowering the conversion efficiency. Thus, to address such situation, an Embodiment 2 will be described below.

Embodiment 2

Figure 5:
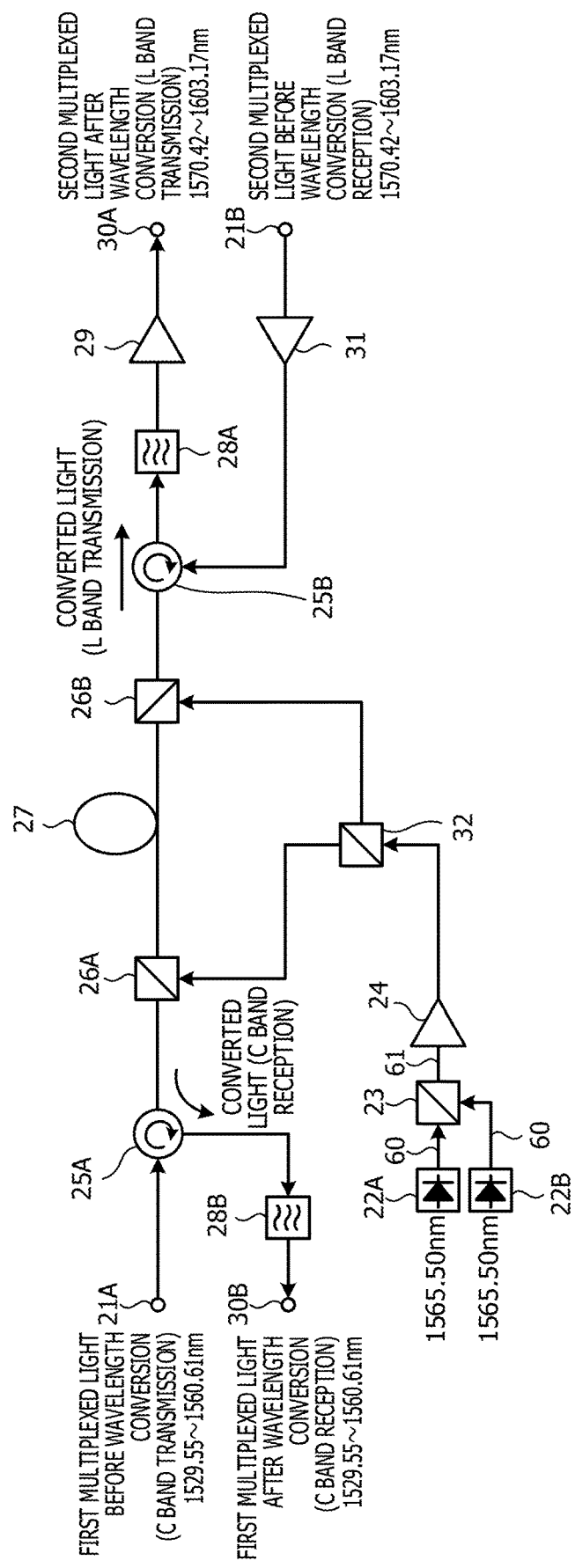
FIG. 5 is a view illustrating an example of a wavelength conversion part in an Embodiment 2.

FIG. 5 is a view illustrating an example of a wavelength conversion part 13 in an Embodiment 2. The same components as those of the wavelength conversion part 13 in the Embodiment 1 are given the same reference numerals, and overlapping description about the configurations and operations is omitted. A difference between the wavelength conversion part 13 illustrated in FIG. 5 and the wavelength conversion part 13 illustrated in FIG. 2 is that a second WDM coupler 26B is disposed between the nonlinear fiber 27 and the second optical circulator 25B. Another difference is that an optical blanching coupler 32 is disposed between the first WDM coupler 26A and the first optical amplification part 24. The first light source 22A is connected to the PBS 23, and the second light source 22B is connected to the PBS 23 via the polarization-maintaining fiber 60. The optical blanching coupler 32 outputs first pump light and the second pump light, which were optically amplified by the first optical amplification part 24, to the first WDM coupler 26A and the second WDM coupler 26B at an optical branching ratio of 5:5. The first WDM coupler 26A outputs the first pump light and the second pump light from the optical blanching coupler 32 to the nonlinear fiber 27. The nonlinear fiber 27 wavelength-converts the first multiplexed light in the C band into the second multiplexed light in the L band by four-wave mixing of the first multiplexed light (signal light) in the C band, and the first pump light and the second pump light having the same direction as the signal light from the first WDM coupler 26A.

The second WDM coupler 26B outputs the first pump light and the second pump light from the optical blanching coupler 32 to the nonlinear fiber 27. The nonlinear fiber 27 wavelength-converts the second multiplexed light in the L band into the first multiplexed light in the C band by four-wave mixing of the second multiplexed light (signal light) in the L band, and the first pump light and the second pump light having the same direction as the signal light from the second WDM coupler 26B.

The wavelength conversion part 13 in the Embodiment 2 outputs the first pump light and the second pump light from the first WDM coupler 26A to the nonlinear fiber 27 in the same direction of the propagation direction of the first multiplexed light (signal light) in the C band. The nonlinear fiber 27 wavelength-converts the first multiplexed light in the C band into the second multiplexed light in the L band by using four-wave mixing of the first multiplexed light in the C band, the first pump light, and the second pump light. Further, the wavelength conversion parts 13 outputs the first pump light and the second pump light from the second WDM coupler 26B to the nonlinear fiber 27 in the same direction as the propagation direction of the second multiplexed light (signal light) in the L band. The nonlinear fiber 27 wavelength-converts the second multiplexed light in the L band into the first multiplexed light in the C band by four-wave mixing of the second multiplexed light in the L band, the first pump light, and the second pump light. That is, since the wavelength conversion part 13 outputs the first pump light and second pump light to the nonlinear fiber 27 in the same direction as the propagation direction of the signal light, as compared to the Embodiment 1, the wavelength conversion efficiency becomes higher. The conversion efficiency of the wavelength conversion part 13 is improved by inputting the pump light in the same direction as the propagation direction of the signal light to match the signal light to the pump light in phase.

Since the conversion efficiency of the wavelength conversion part 13 also depends on the intensity of the pump light, output power of the first optical amplification part 24 may be set to be higher than output power of the first optical amplification part 24 in the Embodiment 1 by a loss of the optical blanching coupler 32.

In the wavelength conversion part 13 illustrated in FIG. 2, the first pump light from the first light source 22A and the second pump light from the second light source 22B have the same light wavelength. However, a wavelength difference between the first pump light and the second pump light may occur due to a change in external environment such as temperature change. Thus, to address such situation, an Embodiment 3 will be described below.

Embodiment 3

Figure 6:
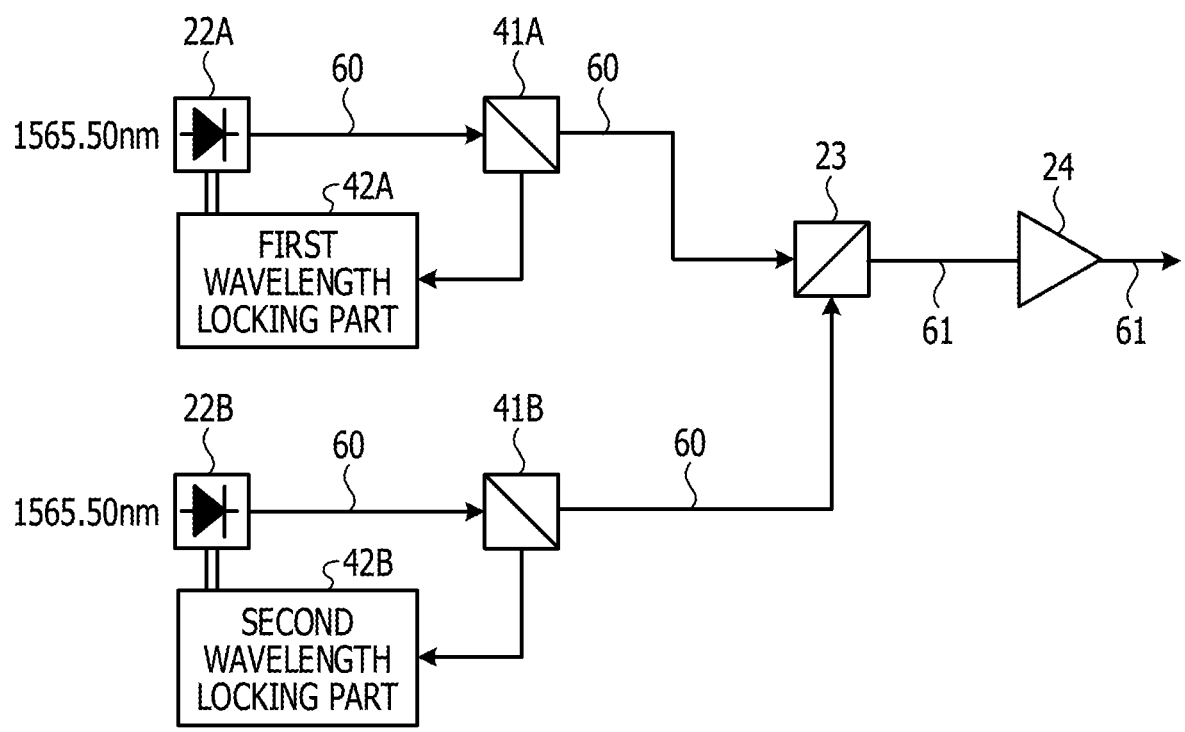
FIG. 6 is a view illustrating an example of a wavelength conversion part in an Embodiment 3.

FIG. 6 is a view illustrating an example of a wavelength conversion part 13 in an Embodiment 3. The same components as those of the wavelength conversion part 13 in the Embodiment 1 are given the same reference numerals, and overlapping description about the configurations and operations is omitted. A difference between the wavelength conversion part 13 illustrated in FIG. 6 and the wavelength conversion part 13 illustrated in FIG. 2 is that a first wavelength locking part 42A for locking the light wavelength of the first pump light from the first light source 22A is provided. Another difference is that a second wavelength locking part 42B for locking the light wavelength of the second pump light from the second light source 22B is provided.

Further, a first optical branching coupler 41A is disposed between the first light source 22A and the PBS 23. The first optical branching coupler 41A outputs a portion of the first pump light from the first light source 22A to the first wavelength locking part 42A, and outputs remaining first pump light to the PBS 23. The first wavelength locking part 42A controls the first light source 22A such that the light wavelength of the first pump light from the first optical branching coupler 41A becomes a target wavelength. The first light source 22A is connected to the PBS 23, and the second light source 22B is connected to the PBS 23 via the polarization-maintaining fiber 60.

A second optical branching coupler 41B is disposed between the second light source 22B and the PBS 23. The optical branching ratio of the second optical branching coupler 41B is the same as that of the first optical branching coupler 41A. The second optical branching coupler 41B outputs a portion of second pump light from the second light source 22B to the second wavelength locking part 42B, and outputs remaining second pump light to the PBS 23. The second wavelength locking part 42B controls the second light source 22B such that the light wavelength of the second pump light from the second optical branching coupler 41B becomes a target wavelength. The target wavelength of the first wavelength locking part 42A is the same as the target wavelength of the second wavelength locking part 42B. The target wavelength is set to ±0.01 nm of the target wavelength. The PBS 23 may set such that a difference between the first pump light and the second pump light in wavelength falls within the range of ±0.01 nm. In this manner, the difference between the first pump light and the second pump light in wavelength may be decreased to improve the wavelength conversion efficiency.

In the wavelength conversion parts 13 in the Embodiment 3, the first light source 22A and the second light source 22B are independently controlled by using the first wavelength locking part 42A and the second wavelength locking part 42B. However, an Embodiment 4 as a modification will be described below.

Embodiment 4

Figure 7:
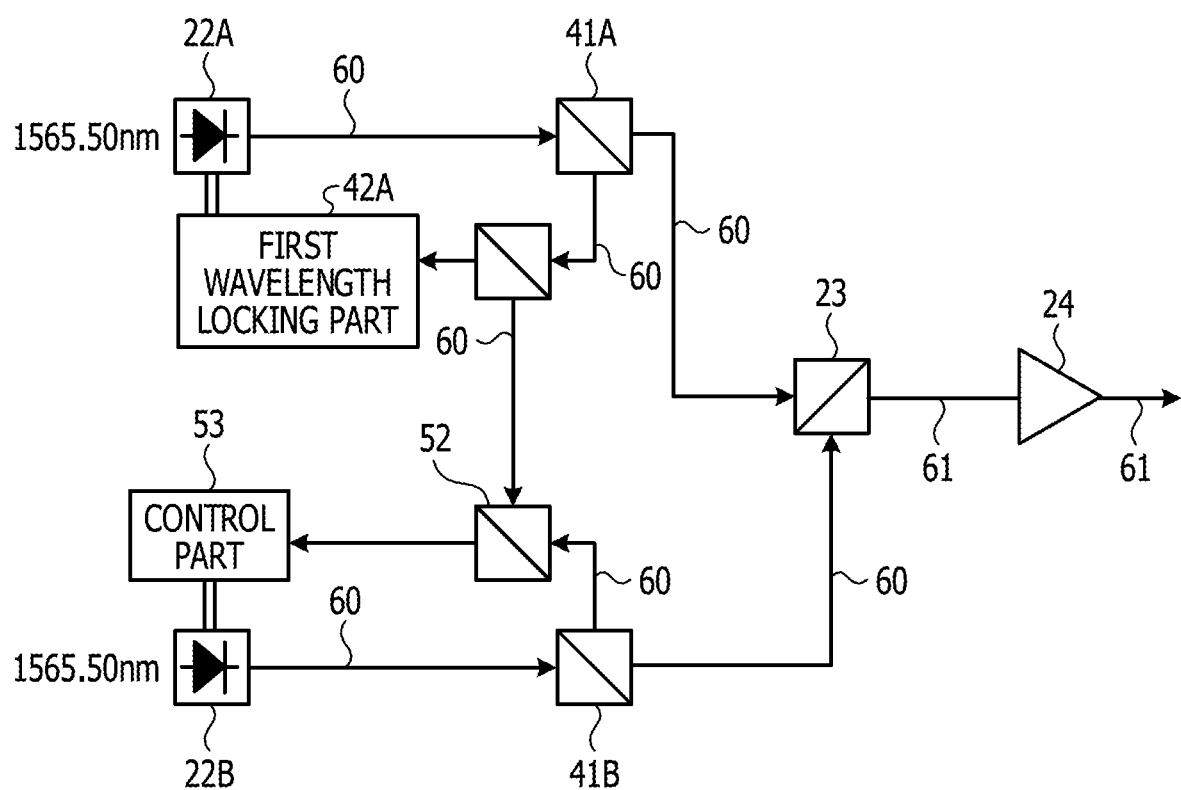
FIG. 7 is a view illustrating an example of a wavelength conversion part in an Embodiment 4.

FIG. 7 is a view illustrating a wavelength conversion part 13 in an Embodiment 4. The same components as those of the wavelength conversion part 13 in the Embodiment 3 are given the same reference numerals, and overlapping description about the configurations and operations is omitted. A difference between the wavelength conversion part 13 illustrated in FIG. 7 and the wavelength conversion part 13 illustrated in FIG. 6 is that a third optical branching coupler 51, an optical interferometer 52, and a control part 53 are disposed in place of the second wavelength locking part 42B. The first light source 22A is connected to the PBS 23, the second light source 22B is connected to the PBS 23, and the first optical branching coupler 41A is connected to the third optical branching coupler 51 via the polarization-maintaining fiber 60. The second optical branching coupler 41B is connected to the optical interferometer 52, and the third optical branching coupler 51 is connected to the optical interferometer 52 via the polarization-maintaining fiber 60.

The first optical branching coupler 41A outputs a portion of the first pump light from the first light source 22A to the third optical branching coupler 51. The third optical branching coupler 51 outputs the first pump light to the first wavelength locking part 42A and the optical interferometer 52. The first wavelength locking part 42A controls the first light source 22A such that the first pump light becomes a target wavelength.

The second optical branching coupler 41B outputs a portion of the second pump light from the second light source 22B to the optical interferometer 52. The optical interferometer 52 is a detection part, such as a heterodyne interferometer, which generates a beat when there is a wavelength difference between the second pump light from the second optical branching coupler 41B and the first pump light from the third optical branching coupler 51. The control part 53 monitors the beat intensity of the optical interferometer 52, and controls the second light source 22B so as to decrease the beat intensity. That is, the second light source 22B may output the second pump light having a wavelength difference from the first pump light of the first light source 22A in the range of ±0.01 nm. As a result, the wavelength difference between the first pump light and the second pump light may be decreased to improve the wavelength conversion efficiency.

In the above-mentioned embodiments, the optical amplification parts in the C band and the L band use the EDFA, and the optical amplification parts in the S band use the thulium-doped fiber amplifier. However, the optical amplification parts in the O band may use a praseodymium-doped fiber amplifier, and may be appropriately changed. The optical amplification parts in the E band and the U band may use, for example, a semiconductor optical amplifier or a Raman amplifier, and may be appropriately changed.

In the WDM system 1 in the above-mentioned embodiment, the wavelength conversion parts 13 for bidirectional wavelength conversion between the C band and the L band, and between the C band and the S band are described. However, for example, a wavelength conversion part for unidirectional wavelength conversion between the C band and the L band may be used, and an Embodiment 5 will be described as an embodiment using such wavelength conversion part.

Embodiment 5

Figure 8:
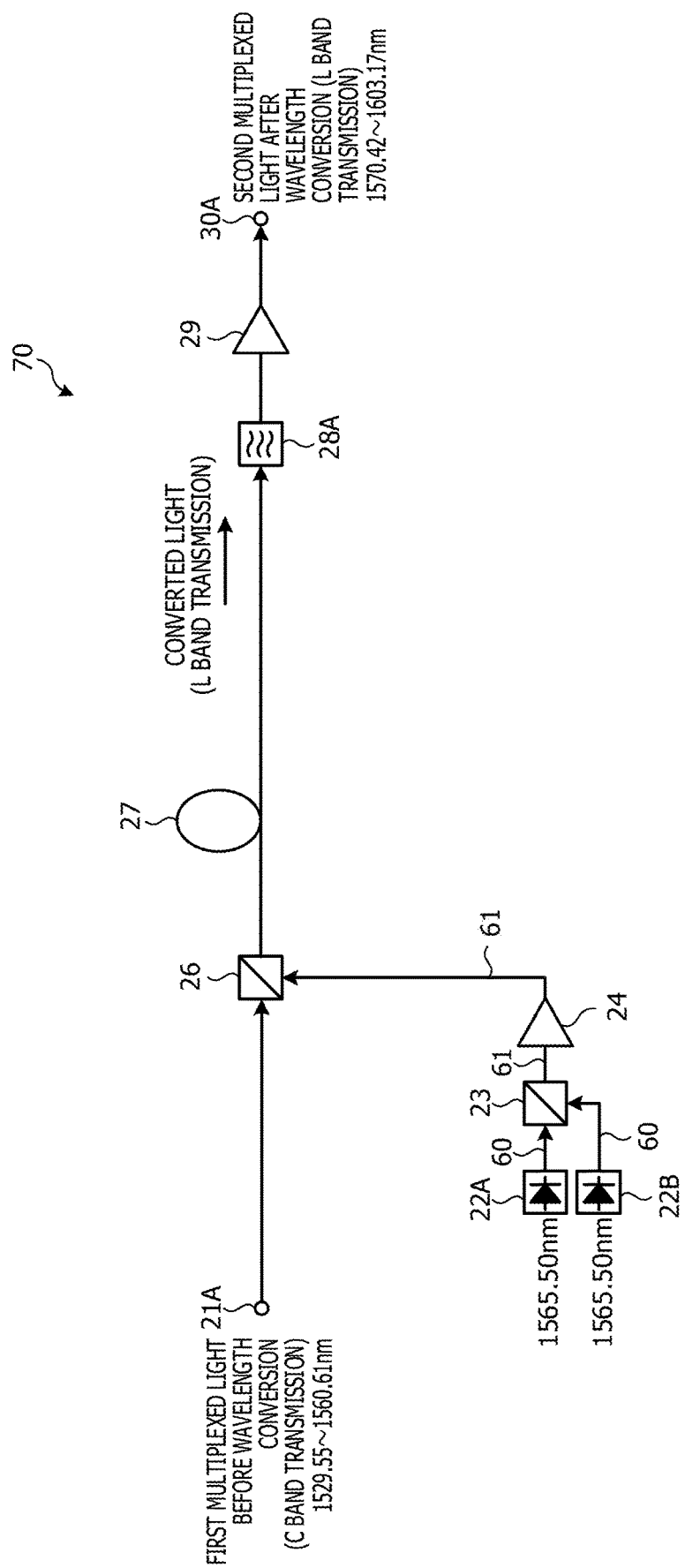
FIG. 8 is a view illustrating an example of a wavelength conversion part in an Embodiment 5.
Figure 9:
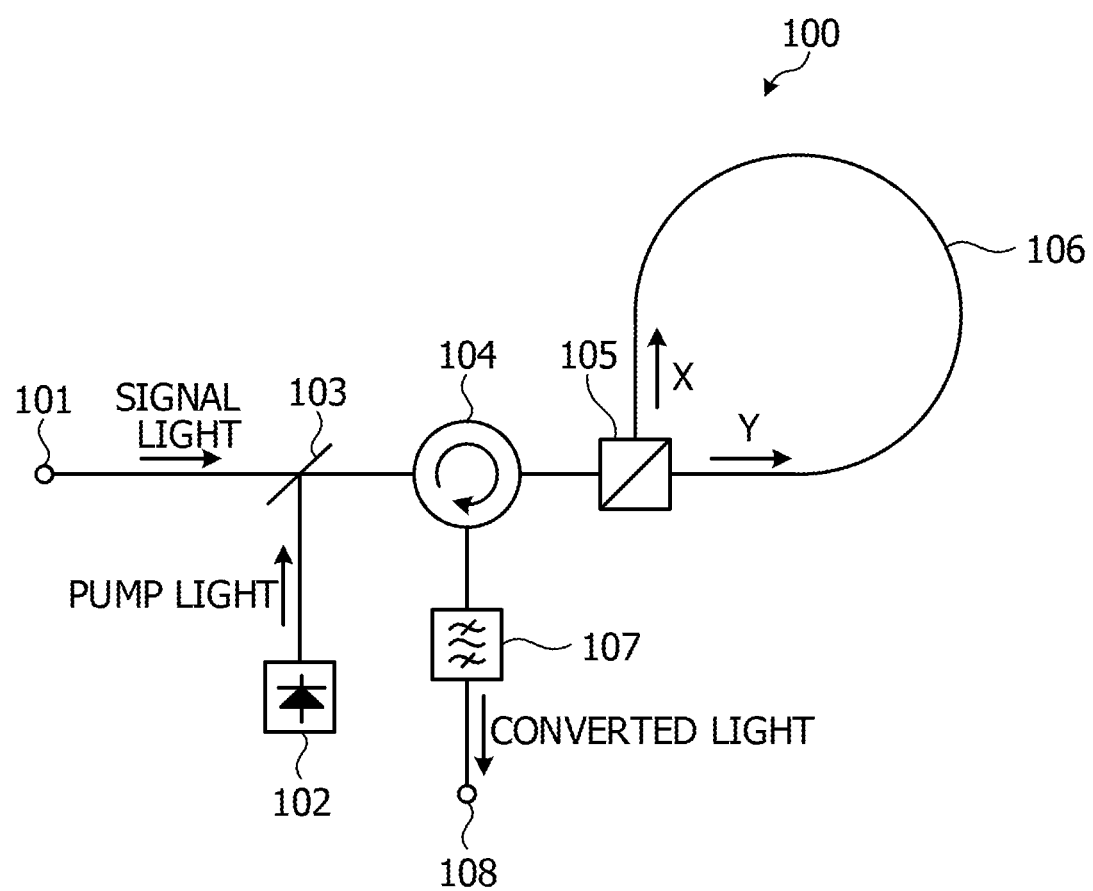
FIG. 9 is a view illustrating an example of a conventional wavelength converter.
Figure 10:
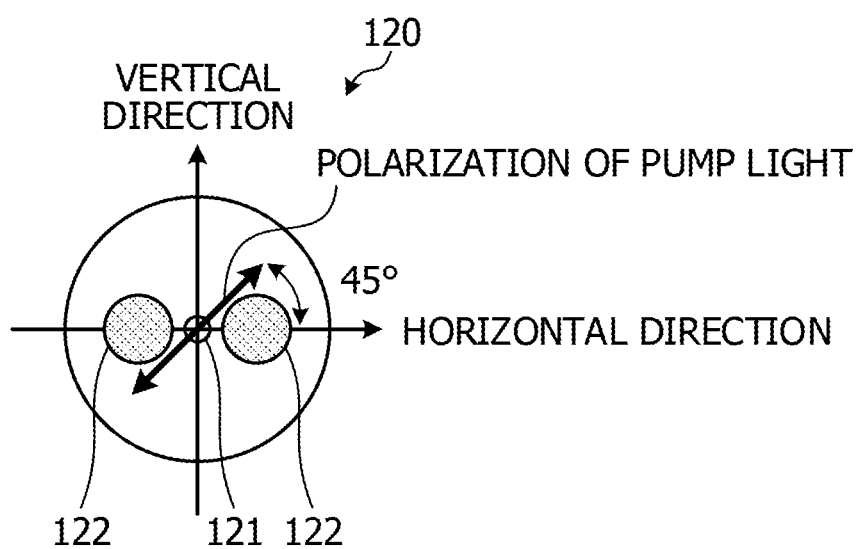
FIG. 10 is a view illustrating an example of a polarization state of pump light in a polarization-maintaining nonlinear fiber.

FIG. 8 is a view illustrating an example of a wavelength conversion part 70 in an Embodiment 5. The same components as those of the wavelength conversion part 13 illustrated in FIG. 2 are given the same reference numerals, and overlapping description about the configurations and operations is omitted.

A difference between the wavelength conversion part 70 illustrated in FIG. 8 and the wavelength conversion part 13 illustrated in FIG. 2 is that the wavelength conversion part 70 is a unidirectional wavelength conversion part that wavelength-converts the first multiplexed light in the C band into the second multiplexed light in the L band. The wavelength conversion part 70 illustrated in FIG. 8 has a first input part 21A, a first light source 22A, a second light source 22B, a PBS 23, and a first optical amplification part 24. The wavelength conversion parts 13 further has a first WDM coupler 26A, a nonlinear fiber 27, a first optical BPF 28A, a second optical amplification part 29, and a first output part 30A. The PBS 23 connects the first light source 22A to the second light source 22B via the polarization-maintaining fiber 60 maintaining the polarization state. The PBS 23 is connected to the nonlinear fiber 27 via the normal fiber 61. The first input part 21A is connected to the nonlinear fiber 27, and the nonlinear fiber 27 is connected to the first output part 30A via the normal fiber 61.

For example, the first input part 21A inputs the first multiplexed light (signal light) in the C band, and outputs the first multiplexed light to the first WDM coupler 26A. The first light source 22A generates the first pump light and outputs the first pump light to the PBS 23. The second light source 22B generates the second pump light and outputs the second pump light to the PBS 23. The PBS 23 polarization-combines the first pump light and the second pump light such that the first pump light is orthogonal to the second pump light to generate horizontally-polarized first pump light and vertically-polarized second pump light. The PBS 23 outputs the horizontally-polarized first pump light and the vertically-polarized second pump light to the first optical amplification part 24.

Further, the first optical amplification part 24 optically amplifies the horizontally-polarized first pump light and the vertically-polarized second pump light, and outputs the optically-amplified first pump light and second pump light to the first WDM coupler 26A. The first WDM coupler 26A multiplexes the first multiplexed light in the C band from the first input part 21A, and the first pump light and the second pump light from the first optical amplification part 24, and outputs multiplexed light to the nonlinear fiber 27. The nonlinear fiber 27 wavelength-converts the first multiplexed light in the C band into the second multiplexed light (converted light) in the L band by four-wave mixing of the horizontally-polarized first pump light, the vertically-polarized second pump light, and the first multiplexed light in the C band while maintaining the first multiplexed light in the C band. The nonlinear fiber 27 outputs the first multiplexed light in the C band before wavelength conversion, the second multiplexed light (converted light) in the L band after wavelength conversion, the first pump light, and the second pump light to the first optical BPF 28A.

The first optical BPF 28A extracts the second multiplexed light (converted light) in the L band from light outputted from the nonlinear fiber 27, and outputs the extracted second multiplexed light in the L band to the second optical amplification part 29. The second optical amplification part 29 optically amplifies the second multiplexed light in the L band, and outputs the optically-amplified second multiplexed light in the L band to the first output part 30A.

In the PBS 23 in the wavelength conversion part 70 in the Embodiment 5, the first light source 22A is connected to the second light source 22B via the polarization-maintaining fiber 60. Then, the PBS 23 polarization-combines first pump light from the first light source 22A and second pump light from the second light source 22B. Then, the PBS 23 outputs the vertically-polarized first pump light and the horizontally-polarized second pump light to the nonlinear fiber 27 via the first optical amplification part 24 and the first WDM coupler 26A. As a result, normal fiber-type optical components may be provided between the PBS 23 and the nonlinear fiber 27, and the vertically-polarized pump light and the horizontally-polarized pump light in the maintained polarization state may be inputted to the nonlinear fiber 27 while using a reduced number of polarization-maintaining fiber-type optical components.

In this embodiment, the wavelength conversion part for wavelength-converting the first multiplexed light in the C band into the second multiplexed light in the L band is described. However, the wavelength conversion part is not necessarily applied to the multiplexed light, and may convert the signal light in the C band into converted light in the L band, and changed as appropriate. For convenience of explanation, the C band is used as a reference. However, the wavelength conversion part may be applied to a transmission system that performs waveform conversion between the S band and the L band: from the S band into the L band and from the L band into the S band, and be changed as appropriate.

In the first transmission device 2A in the above-mentioned embodiment, the pump light used for the wavelength conversion part 13 may be reused for another wavelength conversion part 13 in the same device. Further, the pump light for optical component such as the optical amplification part may be used for another wavelength conversion part 13 and other optical components, and be changed as appropriate.

The wavelength conversion part 13 causes the multiplexed light and the pump light to propagate to the nonlinear fiber 27, thereby converting the multiplexed light into light in any wavelength band. Pump light of FM modulation (or PM modulation) may be used.

In the transmission system in the above-mentioned embodiments, using the optical component in the C band, multiplexed light in the C band is wavelength-converted into light in the S band or the L band and transmitted to the transmission lines 3A, 3B. However, using the optical component in the S band, the multiplexed light in the S band may be wavelength-converted into light in the C band or the L band and transmitted to the transmission lines 3A, 3B, or using the optical component in the L band, multiplexed light in the L band may be wavelength-converted into light in the C band or the S band and transmitted to the transmission lines 3A, 3B.

In the above-mentioned embodiments, the wavelength ranges of the C band, the S band, and the L band are defined. However, the present disclosure is not limited to these wavelength ranges and any other suitable range may be set.

The wavelength conversion part 13 includes an optical amplification part not illustrated for optically amplifying multiplexed light in unit of wavelength. However, the optical amplification part may be provided outside of the wavelength conversion part 13, that is, in the output stage of the wavelength conversion part 13.

Further, in the above-mentioned embodiments, the C band, the S band, and the L band are used and however, the wavelength band is not limited to the C band, the S band, and L band. For example, the O band, the E band, and the U band may be used and changed as appropriate.

For example, the first transmission device 2A includes the optical transmission part or the optical reception part. However, according to the present disclosure, the first transmission device 2A may be externally connected to the optical transmission part or the optical reception part.

For convenience of explanation, the wavelength conversion parts 13 include optical components such as the first light source 22A and the second light source 22B. However, the wavelength conversion parts 13 may not include optical components such as the first light source 22A and the second light source 22B.

The illustrated constituents are not necessarily physically configured as illustrated in the drawings. That is, specific dispersion and integration modes of the constituents are not limited to the illustrated modes. According to various loads and usage situations, whole or part of the constituents may be dispersed or integrated in any unit functionally or physically.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength converter comprising:
   a first light source configured to generate first pump light;
   a second light source configured to generate second pump light having the same wavelength as the first pump light;
   a polarization combiner configured to polarization-combine the first pump light and the second pump light such that the first pump light is orthogonal to the second pump light;
   a nonlinear medium configured to wavelength-convert first signal light inputted from a first port into second signal light having a wavelength band that is different from a wavelength band of the first signal light by using the polarization-combined first pump light and second pump light to output the second signal light after wavelength conversion from a second port, and to wavelength-convert the second signal light inputted from the second port into first signal light by using the polarization-combined first pump light and second pump light to output the first signal light after wavelength conversion from the first port;

a first circulator configured to input the first signal light from the first port into the nonlinear medium, and output the first signal light after wavelength conversion in the nonlinear medium from the first port; and a second circulator configured to input the second signal light from the second port into the nonlinear medium, and output the second signal light after wavelength conversion in the nonlinear medium from the second port.

2. The wavelength converter according to claim 1, further comprising:

a multiplexer configured to input the polarization-combined first pump light and second pump light into the nonlinear medium in the same direction as a propagation direction of the first signal light.

3. The wavelength converter according to claim 1, further comprising:

a coupler configured to branch the polarization-combined first pump light and second pump light;

a first multiplexer configured to input a portion of the branched first pump light and second pump light into the nonlinear medium in the same direction as a propagation direction of the first signal light inputted from the first port; and a second multiplexer configured to input a remaining portion of the branched first pump light and second pump light into the nonlinear medium in the same direction as a propagation direction of the second signal light inputted from the second port.

4. The wavelength converter according to claim 1, further comprising:

a first wavelength locking part configured to control the first light source such that the first pump light has a target wavelength; and a second wavelength locking part configured to control the second light source such that the second pump light has the target wavelength.

5. The wavelength converter according to claim 1, further comprising:

a wavelength locking part configured to control the first light source such that the first pump light has a target wavelength; and a detector configured to detect a difference between the first pump light from the first light source and the second pump light from the second light source, wherein the second light source is controlled to decrease the difference detected by the detector.

6. A wavelength converter comprising:
a first light source configured to generate first pump light;
a second light source configured to generate second pump light having the same wavelength as the first pump light;
a polarization combiner configured to polarization-combine the first pump light and the second pump light such that the first pump light is orthogonal to the second pump light; and
a nonlinear medium configured to wavelength-convert inputted first signal light into second signal light having a wavelength band that is different from a wavelength band of the first signal light by using the polarization-combined first pump light and second pump light.

7. A wavelength conversion method comprising:
generating first pump light;
generating second pump light having the same wavelength as a wavelength of the first pump light;
polarization-combining the first pump light and the second pump light such that the first pump light is orthogonal to the second pump light;
wavelength-converting first signal light inputted from a first port into second signal light having a wavelength band that is different from a wavelength band of the first signal light in a nonlinear medium by using the polarization-combined first pump light and second pump light to output the second signal light after wavelength conversion from a second port, and wavelength-converting the second signal light inputted from the second port into first signal light in the nonlinear medium by using the polarization-combined first pump light and second pump light to output the first signal light after wavelength conversion from the first port;
inputting the first signal light from the first port into the nonlinear medium, and outputting the first signal light after wavelength conversion in the nonlinear medium from the first port; and
inputting the second signal light from the second port into the nonlinear medium, and outputting the second signal light after wavelength conversion in the nonlinear medium from the second port.

8. The wavelength conversion method according to claim 7, further comprising:
inputting the polarization-combined first pump light and second pump light into the nonlinear medium in the same direction as a propagation direction of the first signal light.

9. The wavelength conversion method according to claim 7, further comprising:
branching the polarization-combined first pump light and second pump light;
inputting a portion of the branched first pump light and second pump light into the nonlinear medium in the same direction as a propagation direction of the first signal light inputted from the first port; and
inputting a remaining portion of the branched first pump light and second pump light into the nonlinear medium in the same direction as a propagation direction of the second signal light inputted from the second port.

10. The wavelength conversion method according to claim 7, further comprising:
controlling the first light source such that the first pump light has a target wavelength; and
controlling the second light source such that the second pump light has the target wavelength.

11. The wavelength conversion method according to claim 7, further comprising:
a wavelength locking part configured to control the first light source such that the first pump light has a target wavelength; and
a detector configured to detect a difference between the first pump light from the first light source and the second pump light from the second light source, wherein
the second light source is controlled to decrease the difference detected by the detector.

12. A transmission device comprising:
a wavelength converter configured to wavelength-convert first multiplexed light into second multiplexed light having a wavelength band that is different from a wavelength band of the first multiplexed light, and wavelength-convert the second multiplexed light into the first multiplexed light, wherein
the wavelength converter includes:
a first light source configured to generate first pump light;
a second light source configured to generate second pump light having the same wavelength as the first pump light;
a polarization combiner configured to polarization-combine the first pump light and the second pump light such that the first pump light is orthogonal to the second pump light; and
a nonlinear medium configured to wavelength-convert the first multiplexed light inputted from a first port into the second multiplexed light by using the polarization-combined first pump light and second pump light to output the second multiplexed light after wavelength conversion from a second port, and wavelength-convert the second multiplexed light inputted from the second port into the first multiplexed light by using the polarization-combined first pump light and second pump light to output the first multiplexed light after wavelength conversion from the first port;
a first circulator configured to input the first multiplexed light from the first port into the nonlinear medium, and output the first multiplexed light after wavelength conversion in the nonlinear medium from the first port; and
a second circulator configured to input the second multiplexed light from the second port into the nonlinear medium, and output the second multiplexed light after wavelength conversion in the nonlinear medium from the second port.

* * * * *